W. R. CALVERT.
HOSE PIPE.
APPLICATION FILED DEC. 28, 1907.
927,635.
Patented July 13, 1909.
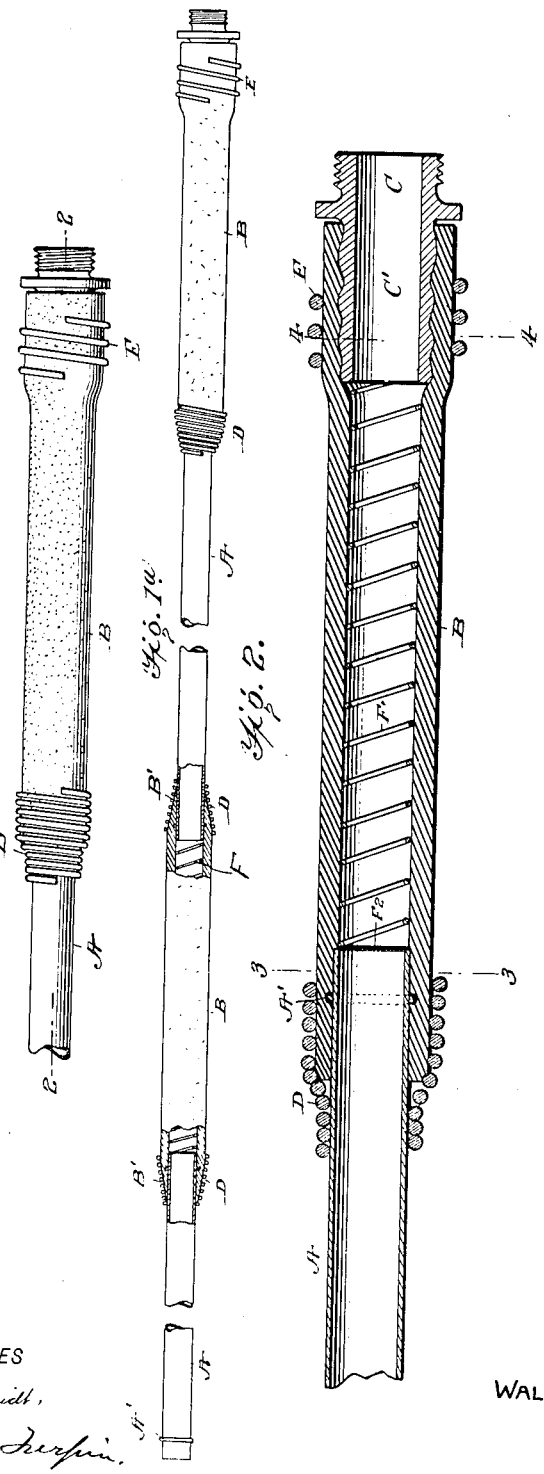
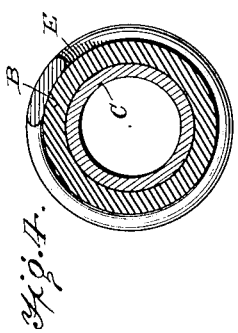
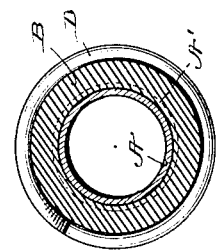
WITNESSES
INVENTOR
WALTER R. CALVERT,
BY
ATTORNEYS

UNITED STATES PATENT OFFICE.

WALTER RILEY CALVERT, OF CHICKASHA, OKLAHOMA, ASSIGNOR, BY DIRECT AND MESNE ASSIGNMENTS, TO CALVERT SECTIONAL HOSE COMPANY, OF CHICKASHA, OKLAHOMA, A CORPORATION OF OKLAHOMA.

HOSE-PIPE.

No. 927,635.      Specification of Letters Patent.      Patented July 13, 1909.

Application filed December 28, 1907. Serial No. 408,358.

*To all whom it may concern:*

Be it known that I, WALTER RILEY CALVERT, a citizen of the United States, and a resident of Chickasha, Oklahoma, have invented certain new and useful Improvements in Hose-Pipes, of which the following is a specification.

My invention is an improvement in hose pipes, and relates particularly to hose pipes comprising sections of metal pipe united by flexible connections; and the invention consists in certain novel constructions and combinations of parts as will be hereinafter described and claimed.

In the drawing Figure 1 is a side view of a hose pipe embodying my invention, parts being broken away. Fig. 1ª is a side view partly in section illustrating a number of metallic pipes and couplings between the same. Fig. 2 is a longitudinal section on about line 2—2 of Fig. 1. Fig. 3 is a cross-section on about line 3—3 of Fig. 2, and Fig. 4 is a cross-section on about line 4—4 of Fig. 2.

In the construction shown, the metallic pipes A are united by flexible hose lengths B, and the latter, except the section which receives the nozzle connection C, may be of uniform diameter throughout as shown in Figs. 1 and 2 or may be tapered or sloped off at their ends at B' as shown in Fig. 1ª to receive the clamping coil D, the hose section receiving the nozzle connection C being suitably formed to fit up over the corrugated nipple C' of the said connection C and to be held thereon by the clamping coil E, as shown in Figs. 1 and 2 of the drawing.

The pipes A are provided on their outer sides near their ends with the flanges A' which fit within the ends of the hose sections B, and engage therewith when the clamping coils D are turned to position shown in Figs. 1 and 2, and increase the security of connection.

The clamping coils D are conical or in the form of frustums, and when turned with a screw action upon the ends of the hose sections B, bind said ends firmly in connection with the pipes A, as will be understood from Figs. 1 and 2 of the drawing.

The clamping coil E is turned with a screw action onto the end of the hose section receiving the nozzle connection C, and secures the parts firmly together, as will be understood from Fig. 1. The clamping coils D and E may be of brass, or other suitable wire, and I also employ within the hose section bracing coils F and F', the coil F' being arranged within the end section receiving the nozzle connection C, and the coils F within the other hose sections and extending throughout the length thereof whereby to reinforce the said sections, prevent them from collapsing and reduce the liability of said coils being broken in use.

The bracing coils F and F', which may be of brass wire operate to keep the short hose sections of rubber from closing up and shutting off the water when making short turns or bends in the manipulation of the hose pipe and they also compel the rubber connections to bend uniformly and on gradual curves.

The clamping coils D, it will be noticed have a diameter at their larger ends of such size as to receive the hose sections and at their other or small ends are of a diameter to fit upon the pipe sections E, which latter may be of galvanized iron, or other suitable material, as will be readily understood.

The flanges A' on the pipes A are preferably formed by means of rounds of wire soldered in place on the pipes, as will be understood from the drawing.

Manifestly the hose sections may be of uniform diameter throughout as shown in Figs. 1 and 2, or they may be tapered at their ends to facilitate the application of the coils thereto as shown in Fig. 1ª.

I claim—

1. The combination of a pipe section, a hose section fitted at its end on the end of the pipe section, such end of the hose section being of substantially the same diameter as the body thereof, and a conical clamping coil formed at one end to fit upon the pipe section and at its other end to receive the hose section and tapered at such end whereby it may be screwed upon the hose section to clamp the same upon the pipe section, substantially as and for the purposes set forth.

2. A hose pipe comprising a hose section, a smaller pipe section fitting in the end of the hose section, and a conical spring coil whose larger convolution operates with a spring action on the maximum diameter of the hose pipe and which tapers thence to its smaller end which embraces the pipe section, substantially as set forth.

WALTER RILEY CALVERT.

Witnesses:
CHAS. M. FECHHEIMER,
JO HERMES.